(12) United States Patent
Wang

(10) Patent No.: US 12,313,962 B2
(45) Date of Patent: May 27, 2025

(54) RECORDER WITH ADJUSTABLE FRONT LENS

(71) Applicant: Fengfei Wang, Shaodong County (CN)

(72) Inventor: Yufeng Wang, Shaodong County (CN)

(73) Assignee: Fengfei Wang, Shaodong County (CN)

( * ) Notice: Subject to any disclaimer, the term of this patent is extended or adjusted under 35 U.S.C. 154(b) by 0 days.

(21) Appl. No.: 18/892,973

(22) Filed: Sep. 23, 2024

(65) Prior Publication Data
US 2025/0147393 A1 May 8, 2025

(30) Foreign Application Priority Data
Nov. 7, 2023 (CN) .......................... 202322994750.2

(51) Int. Cl.
*G03B 17/56* (2021.01)

(52) U.S. Cl.
CPC .................................. *G03B 17/561* (2013.01)

(58) Field of Classification Search
CPC ..... B60R 1/12; B60R 2011/004; B60R 11/04; G03B 17/561
See application file for complete search history.

(56) References Cited

U.S. PATENT DOCUMENTS

| 11,531,253 | B1* | 12/2022 | Chen .................... F16M 11/041 |
| 2023/0211740 | A1* | 7/2023 | LaCross ................... B60R 1/12 348/148 |

* cited by examiner

*Primary Examiner* — Xi Wang

(57) ABSTRACT

A recorder with an adjustable front lens includes a recorder main body and a camera. The camera is arranged on the recorder main body, and the recorder main body is electrically connected to the camera. The camera is capable of rotating relative to the recorder main body. By rotating the camera relative to the recorder main body, a user can rotate the camera to achieve the rotation of the lens, so that the user can record a scene in a desired direction, improving the practicality of the recorder and enhancing the user experience.

15 Claims, 8 Drawing Sheets

RECORDER WITH ADJUSTABLE FRONT LENS

CROSS-REFERENCE TO RELATED APPLICATIONS

The application claims priority of Chinese patent application 202322994750.2, filed on 2023 Nov. 7, which is incorporated herein by reference in its entireties.

TECHNICAL FIELD

The present invention relates to a recorder, particularly to a recorder with an adjustable front lens, applied in the technical field of driving recorders.

BACKGROUND ART

A driving recorder is an instrument that records relevant information such as images and sounds of a vehicle during a journey. After the driving recorder is installed, video images and sounds of the entire process of car driving can be recorded, which can provide evidence for traffic accidents. People who enjoy self driving tours can also use the driving recorder to record the process of conquering difficulties and obstacles. The driving recorder records the time, speed, and location while driving, acting as a "black box".

A front lens of an existing driving recorder is basically fixed, and the recorder is also fixed inside a car. This is to say, neither a camera nor a recorder main body can adjust an angle, and a direction recorded by the lens cannot be switched arbitrarily. However, when a user wants to record the situation inside the car, this recorder cannot meet the demand. If the user wants to record the situation inside the car, a new recorder needs to be purchased, which increases the additional cost for the user and brings inconvenience to the user.

SUMMARY

In order to solve the problems mentioned above that neither a camera nor a recorder main body of an existing driving recorder can adjust an angle, and a direction recorded by the lens cannot be switched arbitrarily, a recorder with an adjustable front lens is provided in the present invention. By rotating a camera relative to a recorder main body, a user can rotate the camera to achieve the rotation of the lens, so that the user can record a scene in a desired direction, improving the practicality of the recorder and enhancing the user experience.

The technical solution adopted by the present invention to solve its technical problems is as follows. A recorder with an adjustable front lens is provided. The recorder includes a recorder main body and a camera. The camera is arranged on the recorder main body, and the recorder main body is electrically connected to the camera. The camera is capable of rotating relative to the recorder main body.

Furthermore, the camera is capable of sliding in a direction away from the recorder main body.

Furthermore, the camera is arranged on a back surface of the recorder main body, the camera is capable of sliding towards a top end of the recorder main body, and the camera is capable of sliding to a position higher than the top end of the recorder main body.

Furthermore, when the camera slides to the position higher than the top end of the recorder main body, the camera is capable of rotating at least 180 degrees, so that an end surface of the camera equipped with a camera lens can rotate from a plane initially opposite to a front surface of the recorder main body to a position where the end surface of the camera equipped with the camera lens is on an identical plane with the front surface of the recorder main body.

Furthermore, the recorder further includes a sliding member. The sliding member is capable of rotating relative to the recorder main body. The camera is arranged at one end of the sliding member. When the sliding member rotates relative to the recorder main body, the camera is driven to slide relative to the recorder main body.

Furthermore, one end of the sliding member near the top end of the recorder main body is provided with a base. A first mounting hole is defined in the base. A bottom portion of the camera is provided with a clamping part. The clamping part is clamped at the first mounting hole and is capable of rotating relative to the base.

Furthermore, the clamping part includes a clamping ring and a connecting neck. One end of the connecting neck is connected to the camera, and the clamping ring is arranged at an opposite end of the connecting neck. The clamping ring passes through the first mounting hole and is arranged on an inner side surface of the base. The connecting neck is positioned inside the first mounting hole, and a rubber ring is sleeved on the connecting neck. The rubber ring is positioned between the connecting neck and a side wall of the first mounting hole.

Furthermore, the clamping ring and the connecting neck are integrally formed, and the connecting neck is integrally formed with an outer shell of the camera. The outer shell of the camera includes an upper shell and a lower shell. A first part of the clamping ring and a first part of the connecting neck are integrally formed with the upper shell. A second part of the clamping ring and a second part of the connecting neck are integrally formed with the lower shell. When the upper shell and the lower shell are closed to each other, the first part of the clamping ring and the second part of the clamping ring form the complete clamping ring, and the first part of the connecting neck and the second part of the connecting neck form the complete connecting neck.

Furthermore, the inner side surface of the base is fixedly provided with a position limiting block, and a bottom portion of the clamping ring is fixedly provided with an abutting block. The position limiting block is used for abutting against the abutting block.

Furthermore, the back surface of the recorder main body is provided with a storage slot. A length extension direction of the storage slot is arranged towards a width extension direction of the recorder main body. The camera is capable of sliding via the sliding member to be stored in the storage slot.

Furthermore, sliding teeth are provided on both sides of the sliding member, and a clamping block is provided on the recorder main body. The clamping block is capable of clamping the sliding teeth, and the sliding teeth are capable of sliding relative to the clamping block.

Furthermore, the recorder further includes a mounting component. The mounting component is installed on the recorder main body. The mounting component is used for installing the recorder main body on a platform.

Furthermore, a back surface of the recorder main body is provided with second mounting holes, and the mounting component is provided with clamping members. The clamping members are capable of being clamped into the second mounting holes, so that the mounting component is capable of being installed on the recorder main body.

Furthermore, the back surface of the recorder main body is provided with one mounting plate. A spacing is provided between the mounting plate and the back surface of the recorder main body. The second mounting holes are defined in the mounting plate, and the clamping members are clamped in the second mounting holes and positioned within the spacing.

Furthermore, the second mounting hole includes a first opening and a second opening. The first opening and the second opening are in communication with each other and are arranged in an L-shape. The clamping member is a clamping piece. The clamping piece is capable of moving through the first opening and moving into the second opening, and the clamping piece is capable of being clamped in the second opening.

Furthermore, a third opening is defined in a side surface of the clamping piece to make the clamping piece L-shaped. A side wall of the third opening is provided with a protrusion, and a side wall of the second opening is provided with a clamping slot. When the clamping piece moves into the second opening through the first opening, the protrusion is placed in the clamping slot.

Furthermore, the mounting component includes a connecting member, a control bolt, fixing bolts, a connecting column, and a chassis.

Furthermore, the connecting member includes a buckle plate. The buckle plate is clamped on a back portion of the recorder main body. A circular groove is defined in a side of the buckle plate away from the recorder main body, and a rolling ball is inserted into an inner side of the circular groove. The rolling ball is fixed to a toothed plate.

Furthermore, the chassis is fixed to the connecting column by the fixing bolts. The control bolt passes through the connecting column to be in threaded connection with the rolling ball. The control bolt is tightened to fix the connecting column.

Furthermore, the back surface of the recorder main body is provided with anti-slip patterns.

Beneficial effects of the present invention are as follows. The recorder with the adjustable front lens is provided. By rotating the camera relative to the recorder main body, the user can rotate the camera to achieve the rotation of the lens, so that the user can record the scene in the desired direction, improving the practicality of the recorder and enhancing the user experience. The sliding member is configured for adjusting a height of the camera, thereby facilitating the user's use. The storage slot is configured for storing the camera, making an overall appearance more tidy, and preventing the camera from being easily damaged when not in a raised state.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

Figure 1:
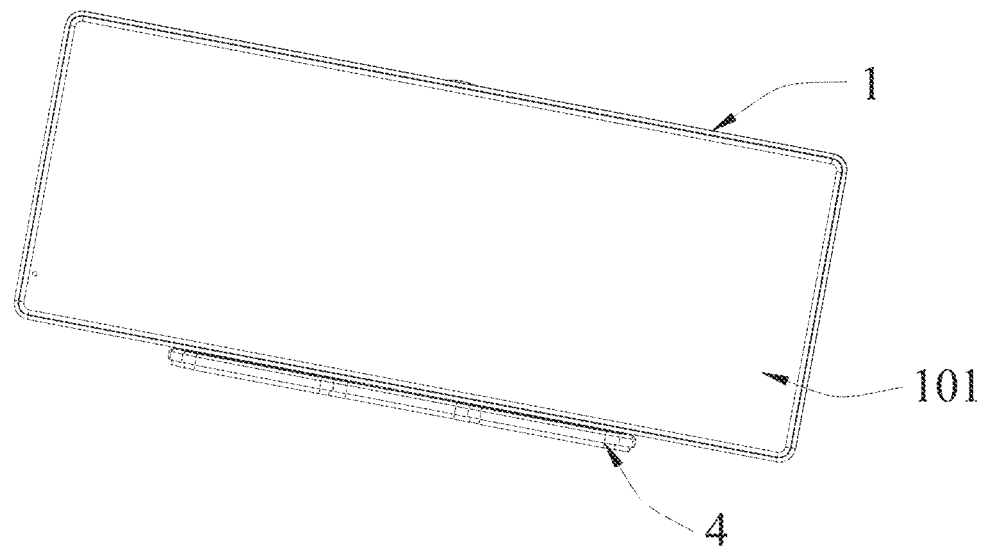
FIG. 1 is a schematic diagram of a recorder in an initial state according to the present invention.
Figure 2:
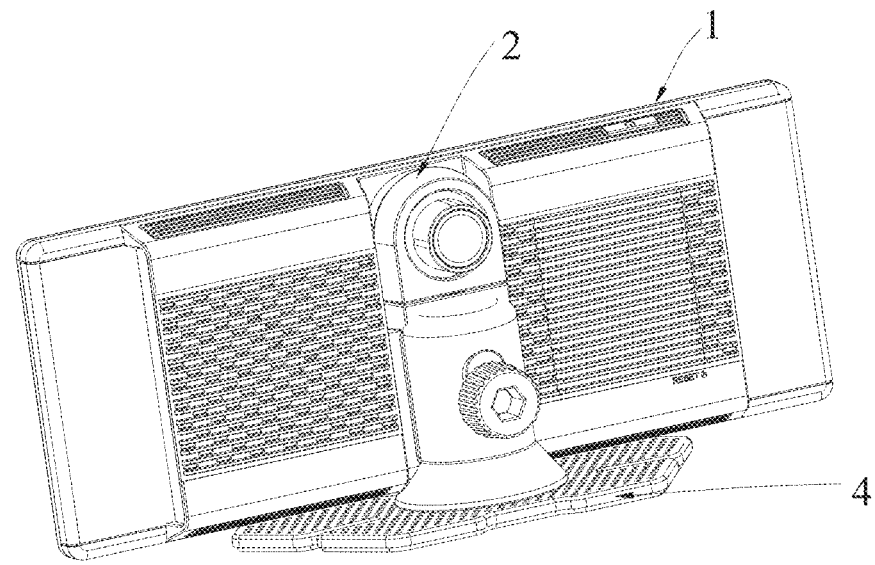
FIG. 2 is a schematic diagram of FIG. 1 from another angle of view according to the present invention.

Reference numerals: recorder main body 1; storage slot 11; front surface 101 of the recorder main body; upper shell 202; lower shell 203; back surface 102 of the recorder main body; clamping block 12; second mounting hole 13; first opening 131; second opening 132; clamping slot 1321; mounting plate 14; spacing 104; anti-slip pattern 15; camera 2; camera lens 201; clamping part 21; clamping ring 211; abutting block 2111; connecting neck 212; rubber ring 213; sliding member 3; base 31; first mounting hole 311; position limiting block 312; sliding teeth 32; mounting component 4; clamping member 41; third opening 411; protrusion 4111; connecting member 42; buckle plate 421; circular groove 422; rolling ball 423; toothed plate 424; control bolt 43; fixing bolt 44; connecting column 45; chassis 46.

DETAILED DESCRIPTION OF THE EMBODIMENTS

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Referring to FIGS. 1-10, a recorder with an adjustable front lens is provided. The recorder includes a recorder main body 1 and a camera 2. The camera 2 is arranged on the recorder main body 1, and the recorder main body 1 is electrically connected to the camera 2. The camera 2 is capable of rotating relative to the recorder main body 1. That is to say, by rotating the camera relative to the recorder main body, a user can rotate the camera to achieve the rotation of the lens, so that the user can record a scene in a desired direction, improving the practicality of the recorder and enhancing the user experience.

In this embodiment, as shown in FIGS. 1-4, the camera 2 is capable of sliding in a direction away from the recorder main body 1 to change from an initial state to a usage state. That is to say, the user can adjust an angle of the camera to move away from or near the recorder main body. The camera is capable of sliding in a direction beyond a top end of the recorder main body, and is capable of sliding in a direction beyond a left side or a right side of the recorder main body, which can be set according to the user's habits. In this embodiment, it is preferred that the camera is capable of sliding in the direction beyond the top end of the recorder main body. The specific structural form is that the camera 2 is arranged on a back surface of the recorder main body 1, the camera 2 is capable of sliding towards the top end of the recorder main body 1, and the camera 2 is capable of sliding to a position higher than the top end of the recorder main body 1. Most cameras are arranged at a position near a top end of a main body. Therefore, sliding towards the top end of the recorder main body can facilitate the user's use and increase the practicality of the recorder.

Figure 3:
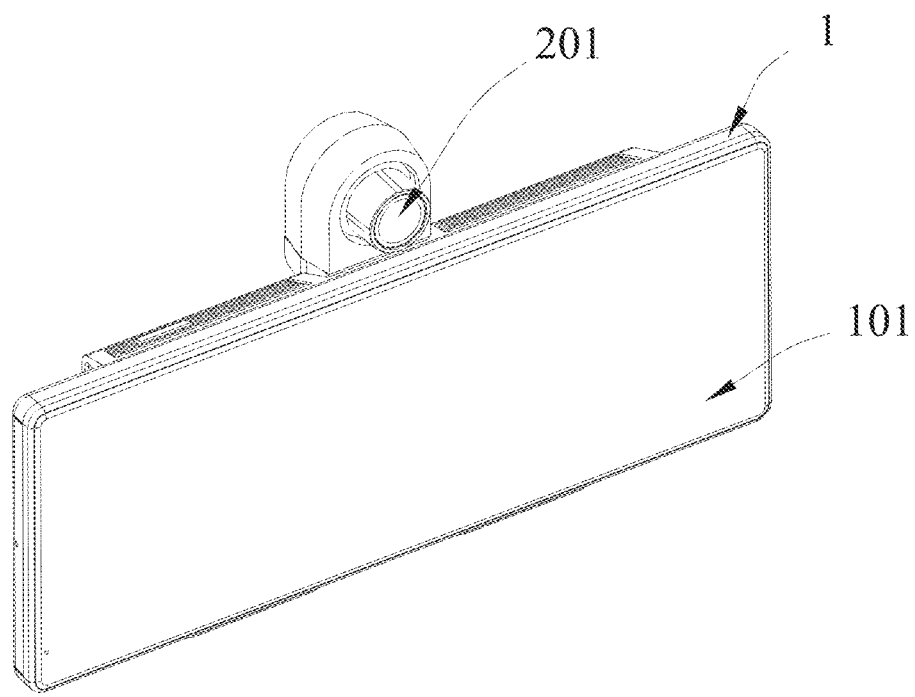
FIG. 3 is a schematic diagram of a recorder in a usage state according to the present invention.
Figure 4:
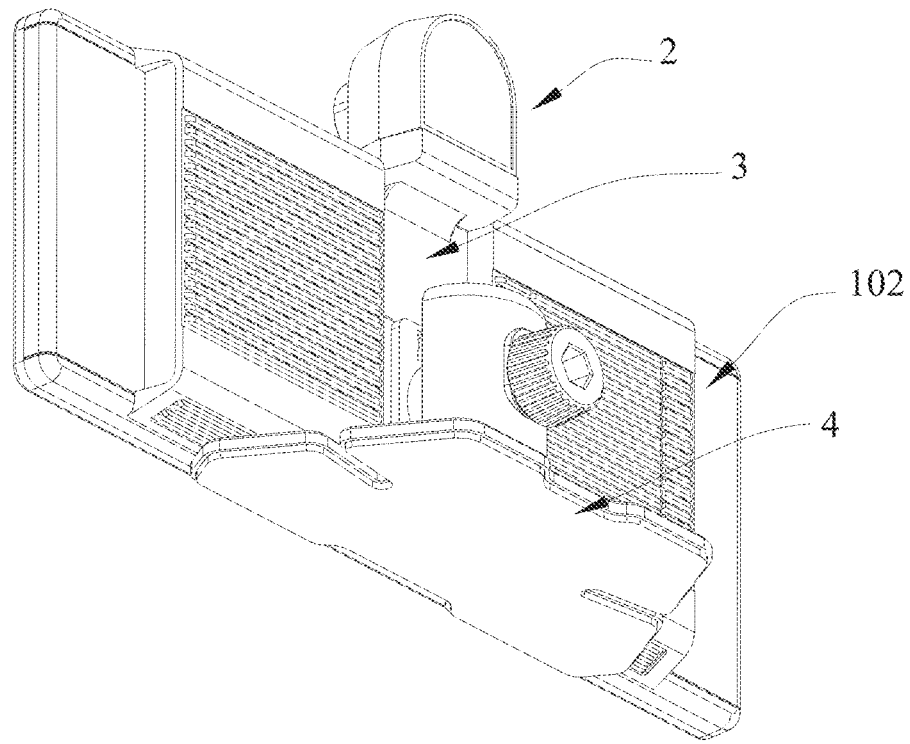
FIG. 4 is a schematic diagram of FIG. 3 from another angle of view according to the present invention.
Figure 5:
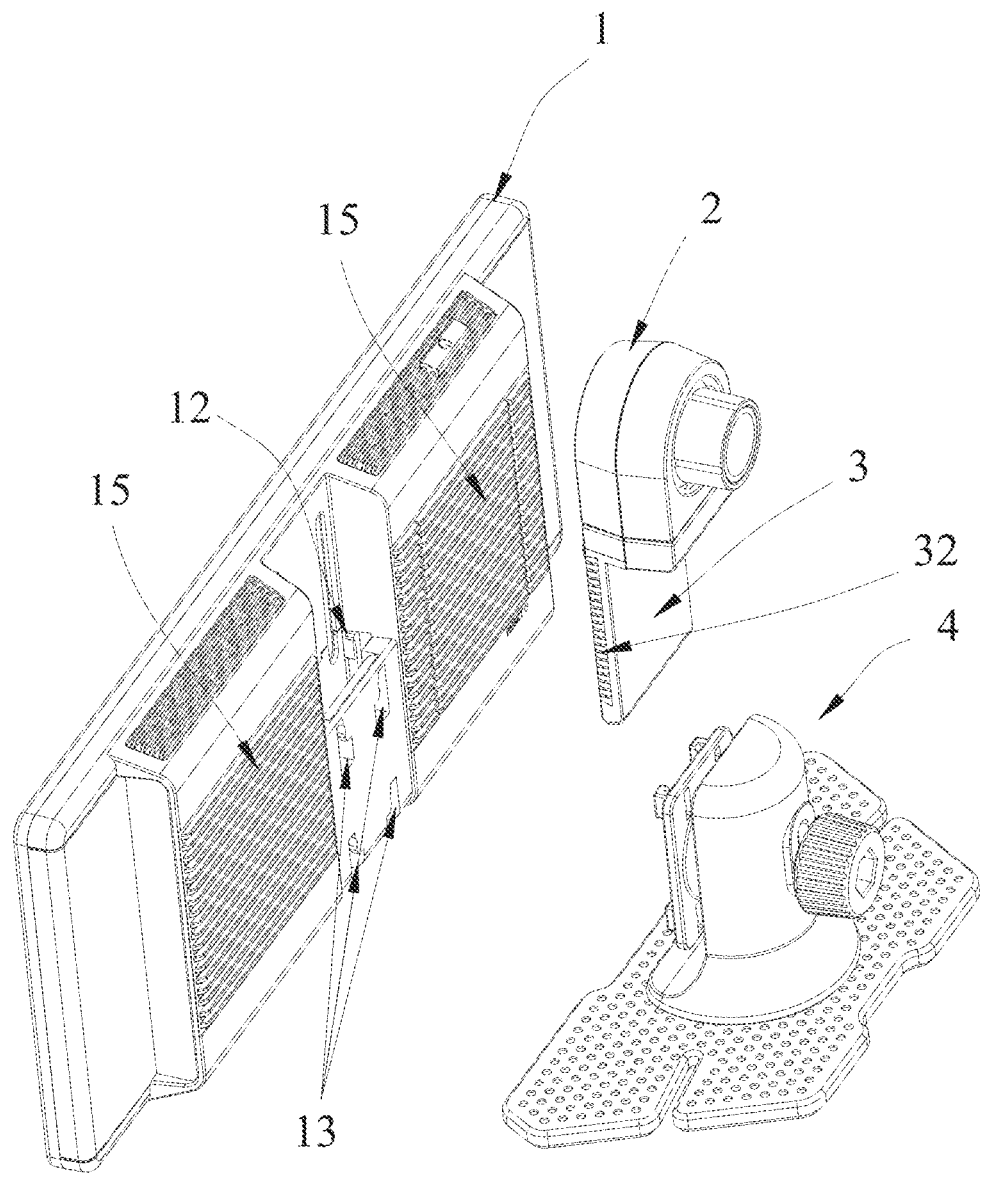
FIG. 5 is an exploded view of a recorder according to the present invention.
Figure 6:
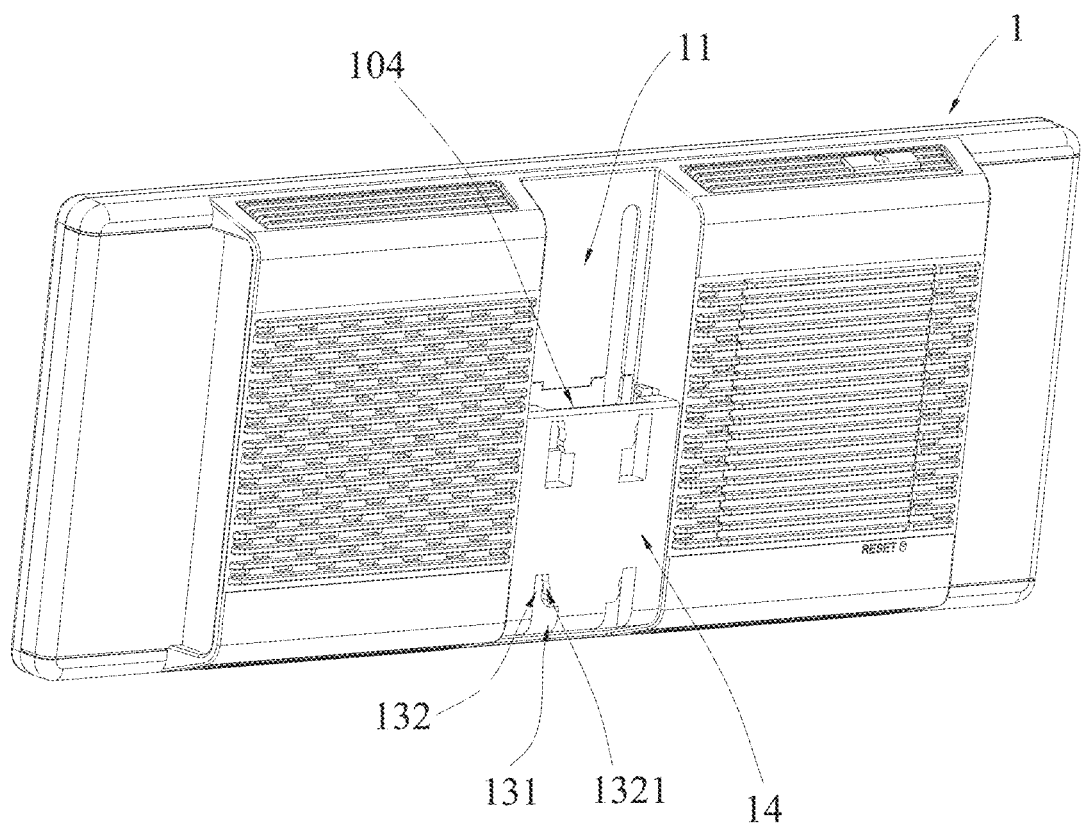
FIG. 6 is a schematic diagram of a back surface of a recorder main body according to the present invention.

In this embodiment, as shown in FIG. 3 and FIG. 4, when the camera 2 slides to the position higher than the top end of the recorder main body 1 from the initial state to the usage state, the camera 2 is capable of rotating at least 180 degrees, so that an end surface of the camera 2 equipped with a camera lens 201 can rotate from a plane initially opposite to a front surface 101 of the recorder main body 1 to a position where the end surface of the camera 2 equipped with the camera lens 201 is on an identical plane with the front surface 101 of the recorder main body 1. That is to say, the recorder can record the scene in the front, back, left or right directions, greatly improving the user experience.

In this embodiment, the recorder further includes a sliding member 3. The sliding member 3 is capable of sliding relative to the recorder main body 1. The camera 2 is arranged at one end of the sliding member 3. When the sliding member 3 slides relative to the recorder main body 1, the camera 2 is driven to slide relative to the recorder main body 1. This structure is convenient for the assembly of the camera, and the structure is simple. The sliding member and the camera are easy to assemble.

Figure 7:
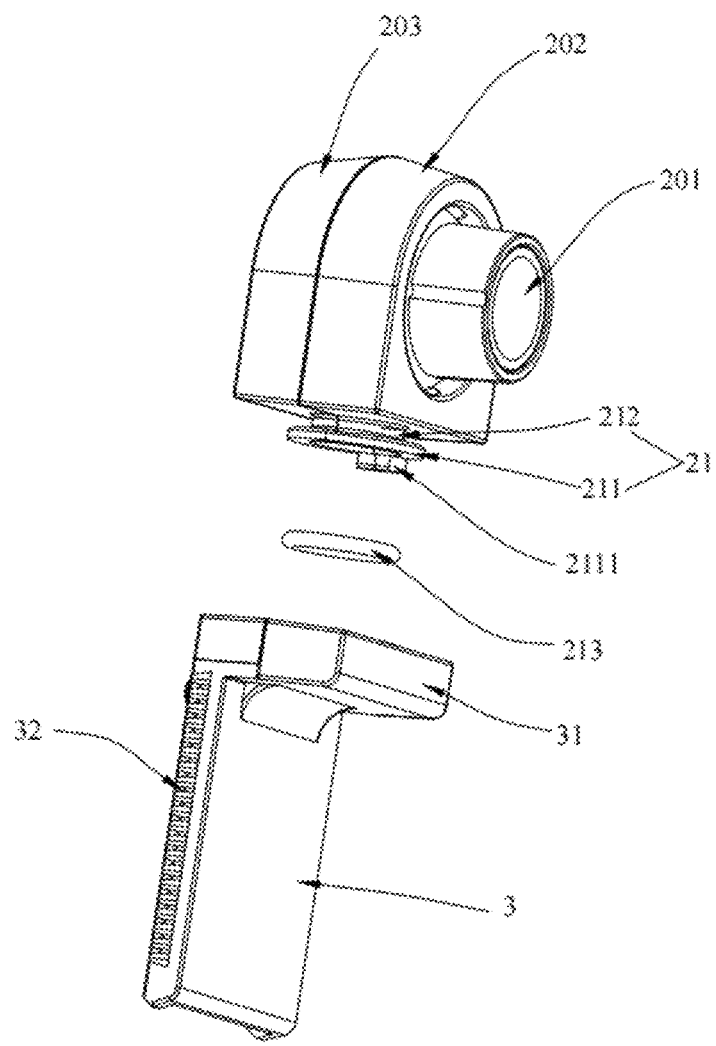
FIG. 7 is a schematic diagram of a connection structure between a camera and a connecting member according to the present invention.
Figure 8:
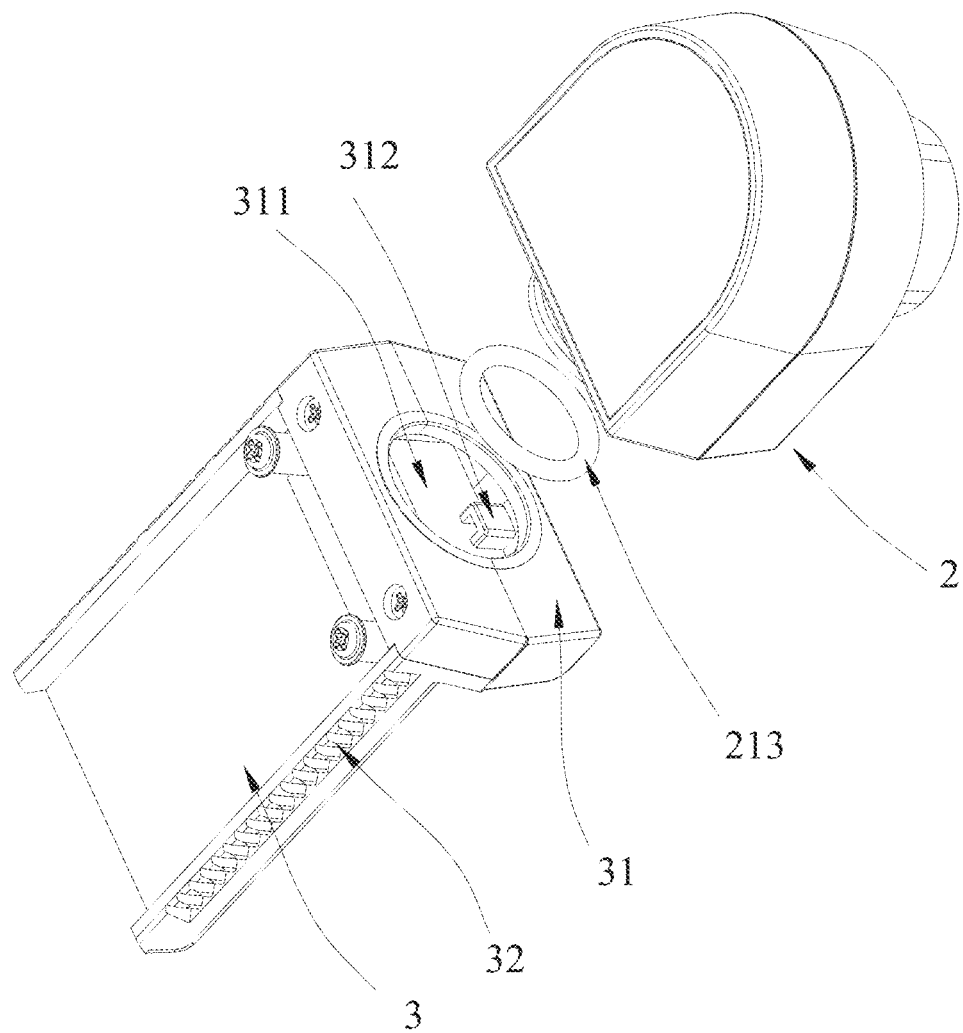
FIG. 8 is a schematic diagram of FIG. 7 from another angle of view according to the present invention.
Figure 9:
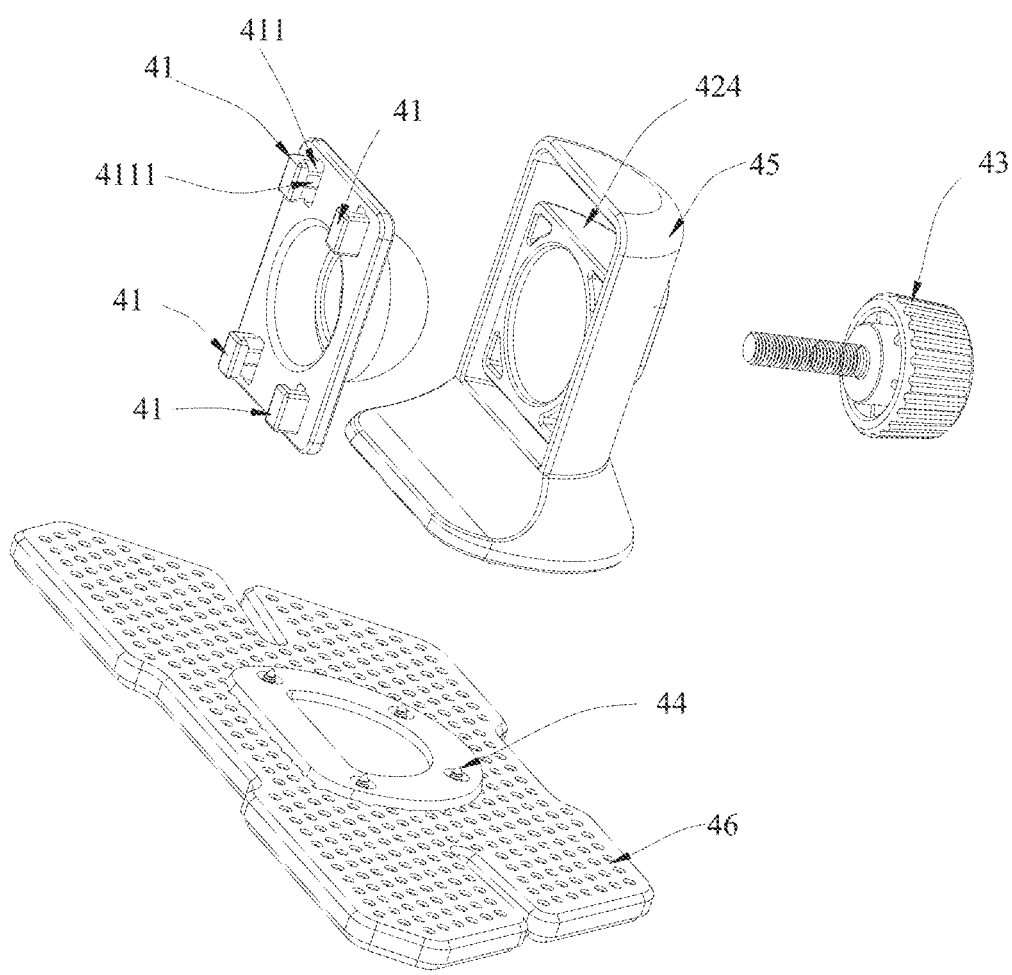
FIG. 9 is an exploded view of a mounting component according to the present invention.
Figure 10:
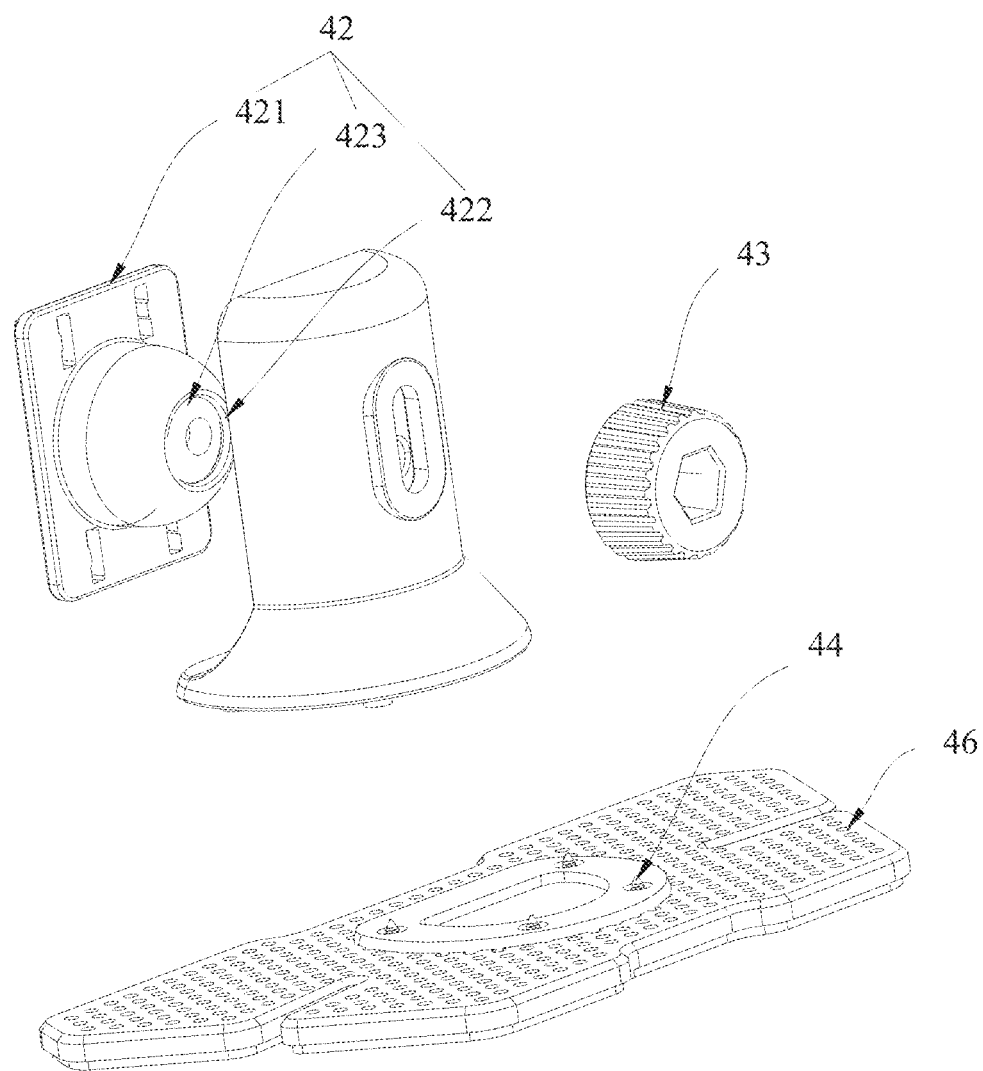
FIG. 10 is a schematic diagram of FIG. 9 from another angle of view according to the present invention.

In this embodiment, as shown in FIGS. 7-8, one end of the sliding member 3 near the top end of the recorder main body 1 is provided with a base 31. A first mounting hole 311 is defined in the base 31. A bottom portion of the camera 2 is provided with a clamping part 21. The clamping part 21 is clamped at the first mounting hole 311 and is capable of rotating relative to the base 31. This structure is simple, easy to assemble the camera, and convenient for the user to rotate the camera. A bottom surface of the sliding member 3 is provided with a first wire passing slot. The back surface of the recorder main body 1 is provided with a second wire passing slot at a position corresponding to a bottom portion of the sliding member 3, thereby facilitating the electrical connection between the recorder main body and the camera through wires.

In this embodiment, the clamping part 21 includes a clamping ring 211 and a connecting neck 212. One end of the connecting neck 212 is connected to the camera 2, and the clamping ring 211 is arranged at an opposite end of the connecting neck 212. The clamping ring 211 passes through the first mounting hole 311 and is arranged on an inner side surface of the base 31. The connecting neck 212 is positioned inside the first mounting hole 311, and a rubber ring 213 is sleeved on the connecting neck 212. The rubber ring 213 is positioned between the connecting neck 212 and a side wall of the first mounting hole 311. The rubber ring 213 and the connecting neck 212 abut against each other to increase clamping, so that a certain force is required to rotate the camera 6. If the setting between the camera and the base is too loose, a direction of the camera is prone to change when the user touches the camera, or the shaking of a car may also cause the direction of the camera to change. The rubber ring 213 not only has a simple structural setting, but also solves the problem that the rotation of the camera is easy to loosen.

In this embodiment, the clamping ring 211 and the connecting neck 212 are integrally formed, and the connecting neck 212 is integrally formed with an outer shell of the camera 2. The outer shell of the camera 2 includes an upper shell 202 and a lower shell 203. A first part of the clamping ring 211 and a first part of the connecting neck 212 are integrally formed with the upper shell 202. A second part of the clamping ring 211 and a second part of the connecting neck 212 are integrally formed with the lower shell 203. When the upper shell 202 and the lower shell 203 are closed to each other, the first part of the clamping ring 211 and the second part of the clamping ring 211 form the complete clamping ring 211, and the first part of the connecting neck 212 and the second part of the connecting neck 212 form the complete connecting neck 212. This structure facilitates the assembly of the camera on the base and also facilitates the installation of internal components of the camera. The upper shell 202 and the lower shell 203 can be closed by clamping or by screw fixing. However, whether the upper shell 202 and the lower shell 203 are closed by clamping or by screw fixing, after the upper shell 202 and the lower shell 203 are assembled, the rubber ring 213 is arranged at the connecting neck to play a further fixing role. When the camera is subjected to a certain pressure, force areas between a screw cap and other parts, and between a screw nut and other parts will be increased, reducing pressures of the screw cap and the screw nut on other parts. The rubber ring 213 is configured to reduce the pressures of the screw cap and the screw nut on other parts, protect other parts from deformation, and tighten a screw more firmly to lock an object and prevent loosening. This is because an original contact area between the screw and the object may be small, resulting in relatively small force and easy loosening, and by using the rubber ring, the contact area can be significantly increased, thereby improving a fixing effect of the screw.

In this embodiment, the inner side surface of the base 31 is fixedly provided with a position limiting block 312, and a bottom portion of the clamping ring 211 is fixedly provided with an abutting block 2111. The position limiting block 312 is used for abutting against the abutting block 2111. The abutting block 2111 at the bottom portion of the clamping ring 211 and the position limiting block 312 will abut against each other to achieve a clamping effect, so that the camera 2 can only rotate 345 degrees, preventing the phenomenon that the wire connected to the camera 2 is damaged caused by the camera 2 being excessively rotated in one direction due to improper user operation during use.

In this embodiment, the back surface of the recorder main body 1 is provided with a storage slot 11. A length extension direction of the storage slot 11 is arranged towards a width extension direction of the recorder main body 1. The camera 2 is capable of sliding via the sliding member 3 to be stored in the storage slot 11, that is, the camera can be stored in its initial state, which can effectively protect the camera from damage and make the overall front surface of the recorder more tidy and beautiful.

In this embodiment, sliding teeth 32 are provided on both sides of the sliding member 3, and a clamping block 12 is provided on the recorder main body 1. The clamping block 12 is capable of clamping the sliding teeth 32, and the sliding teeth 32 are capable of sliding relative to the clamping block 12, that is, the clamping block 12 plays a role of position limiting and supporting. By cooperating with the sliding teeth 32, the structure is simple and easy to assemble.

In this embodiment, the recorder further includes a mounting component 4. The mounting component 4 is installed on the recorder main body 1. The mounting component 4 is used for installing the recorder main body 1 on a platform. The platform can be a desktop, an interior surface of a car, a glass, a wall, etc. The mounting component facilitates the installation of the recorder.

In this embodiment, a back surface 102 of the recorder main body 1 is provided with second mounting holes 13, and the mounting component 4 is provided with clamping members 41. The clamping members 41 are capable of being clamped into the second mounting holes 13, so that the mounting component 4 is capable of being installed on the recorder main body 1. That is to say, this structure shows that the mounting component and the recorder main body are detachably assembled. If the mounting component is fixedly installed on the platform, the recorder main body may be removed from the mounting component for use, increasing the usage scenarios of the recorder and greatly improving the user experience.

In this embodiment, the back surface 102 of the recorder main body 1 is provided with one mounting plate 14. A spacing 104 is provided between the mounting plate 14 and the back surface of the recorder main body 1. The second mounting holes 13 are defined in the mounting plate 14, and the clamping members 41 are clamped in the second mounting holes 13 and positioned within the spacing 104. This arrangement will not damage components inside the recorder main body during the installation of the clamping members of the mounting component, and the conspicuous setting of the mounting plate and the second mounting holes facilitates the installation by the user.

In this embodiment, the second mounting hole 13 includes a first opening 131 and a second opening 132. The first opening 131 and the second opening 132 are in communication with each other and are arranged in an L-shape. The clamping member 41 is a clamping piece. The clamping piece is capable of moving through the first opening 131 and moving into the second opening 132, and the clamping piece is capable of being clamped in the second opening 132. This structure is designed to make the installation of the mounting component more stable.

In this embodiment, a third opening 411 is defined in a side surface of the clamping piece to make the clamping piece L-shaped. A side wall of the third opening 411 is provided with a protrusion 4111, and a side wall of the second opening 132 is provided with a clamping slot 1321.

When the clamping piece moves into the second opening 132 through the first opening 131, the protrusion 4111 is placed in the clamping slot 1321. This structure is designed to make the installation of the mounting component more stable.

In this embodiment, the mounting component 4 includes a connecting member 42, a control bolt 43, fixing bolts 44, a connecting column 45, and a chassis 46.

In this embodiment, the connecting member 42 includes a buckle plate 421. The buckle plate 421 is clamped on a back portion of the recorder main body 1. A circular groove 422 is defined in a side of the buckle plate 421 away from the recorder main body 1, and a rolling ball 423 is inserted into an inner side of the circular groove 422. The rolling ball 423 is fixed to a toothed plate 424. By swinging the recorder main body 1, the recorder main body 1 drives the rolling ball 423 to swing. The rolling ball 423 rolls in the circular groove 422 on the side of the buckle plate 421 away from the recorder main body 1, thereby adjusting an angle of the recorder main body 1. However, a recorder main body in the prior art cannot be adjusted relative to a mounting seat. Therefore, the structure in the present embodiment further brings convenience to the user's use.

In this embodiment, the chassis 46 is fixed to the connecting column 45 by the fixing bolts 44. The control bolt 43 passes through the connecting column 45 to be in threaded connection with the rolling ball 423. The control bolt 43 is tightened to fix the connecting column 45. When the control bolt 43 is loosened, the recorder main body 1 can be moved up and down. After the movement is completed, the control bolt 43 is tightened to make the connecting column 45 and the toothed plate 424 abut against each other, thereby fixing the recorder main body 1 and completing the height adjustment of the recorder main body 1. Compared with the previous structure, this structure further brings convenience to the user's use.

In this embodiment, the back surface 102 of the recorder main body 1 is provided with anti-slip patterns 15, making it convenient for the user to hold the recorder by hand.

In the recorder with the adjustable front lens, the camera 2 can be adjusted by simply pulling the camera 2 upwards. When the camera 2 moves away from the back portion of the recorder main body 1 and reaches a position beyond the top end of the recorder main body 1, the camera 2 can be rotated to capture images inside the car and achieve recording inside the car, making it convenient to use. Moreover, a reuse function of the front lens can reduce a total number of lenses inside the car of the recorder, thereby saving costs.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A recorder with an adjustable front lens, comprising a recorder main body and a camera, wherein the camera is arranged on the recorder main body, the recorder main body is electrically connected to the camera, and the camera is capable of rotating relative to the recorder main body;
    wherein the camera is capable of sliding in a direction away from the recorder main body;
    wherein the camera is arranged on a back surface of the recorder main body, the camera is capable of sliding towards a top end of the recorder main body, and the camera is capable of sliding to a position higher than the top end of the recorder main body;

wherein when the camera slides to the position higher than the top end of the recorder main body, the camera is capable of rotating at least 180 degrees, so that an end surface of the camera equipped with a camera lens can rotate from a plane initially opposite to a front surface of the recorder main body to a position where the end surface of the camera equipped with the camera lens is on an identical plane with the front surface of the recorder main body;

wherein the recorder further comprises a sliding member, the sliding member is capable of rotating relative to the recorder main body, the camera is arranged at one end of the sliding member, and when the sliding member rotates relative to the recorder main body, the camera is driven to slide relative to the recorder main body;

wherein one end of the sliding member near the top end of the recorder main body is provided with a base, a first mounting hole is defined in the base, a bottom portion of the camera is provided with a clamping part, and the clamping part is clamped at the first mounting hole and is capable of rotating relative to the base.

2. The recorder with the adjustable front lens according to claim 1, wherein the clamping part comprises a clamping ring and a connecting neck, one end of the connecting neck is connected to the camera, the clamping ring is arranged at an opposite end of the connecting neck, the clamping ring passes through the first mounting hole and is arranged on an inner side surface of the base, the connecting neck is positioned inside the first mounting hole, a rubber ring is sleeved on the connecting neck, and the rubber ring is positioned between the connecting neck and a side wall of the first mounting hole.

3. The recorder with the adjustable front lens according to claim 2, wherein the clamping ring and the connecting neck are integrally formed, the connecting neck is integrally formed with an outer shell of the camera, the outer shell of the camera comprises an upper shell and a lower shell, a first part of the clamping ring and a first part of the connecting neck are integrally formed with the upper shell, and a second part of the clamping ring and a second part of the connecting neck are integrally formed with the lower shell; when the upper shell and the lower shell are closed to each other, the first part of the clamping ring and the second part of the clamping ring form the complete clamping ring, and the first part of the connecting neck and the second part of the connecting neck form the complete connecting neck.

4. The recorder with the adjustable front lens according to claim 2, wherein the inner side surface of the base is fixedly provided with a position limiting block, a bottom portion of the clamping ring is fixedly provided with an abutting block, and the position limiting block is used for abutting against the abutting block.

5. The recorder with the adjustable front lens according to claim 1, wherein the back surface of the recorder main body is provided with a storage slot, a length extension direction of the storage slot is arranged towards a width extension direction of the recorder main body, and the camera is capable of sliding via the sliding member to be stored in the storage slot.

6. The recorder with the adjustable front lens according to claim 1, wherein the recorder further comprises a mounting component, the mounting component is installed on the recorder main body, and the mounting component is used for installing the recorder main body on a platform.

7. The recorder with the adjustable front lens according to claim 6, wherein a back surface of the recorder main body is provided with second mounting holes, the mounting component is provided with clamping members, and the clamping members are capable of being clamped into the second mounting holes, so that the mounting component is capable of being installed on the recorder main body.

8. The recorder with the adjustable front lens according to claim 7, wherein the back surface of the recorder main body is provided with one mounting plate, a spacing is provided between the mounting plate and the back surface of the recorder main body, the second mounting holes are defined in the mounting plate, and the clamping members are clamped in the second mounting holes and positioned within the spacing.

9. The recorder with the adjustable front lens according to claim 8, wherein the second mounting hole comprises a first opening and a second opening, the first opening and the second opening are in communication with each other and are arranged in an L-shape, the clamping member is a clamping piece, the clamping piece is capable of moving through the first opening and moving into the second opening, and the clamping piece is capable of being clamped in the second opening.

10. The recorder with the adjustable front lens according to claim 9, wherein a third opening is defined in a side surface of the clamping piece to make the clamping piece L-shaped, a side wall of the third opening is provided with a protrusion, a side wall of the second opening is provided with a clamping slot, and when the clamping piece moves into the second opening through the first opening, the protrusion is placed in the clamping slot.

11. The recorder with the adjustable front lens according to claim 6, wherein the mounting component comprises a connecting member, a control bolt, fixing bolts, a connecting column, and a chassis.

12. The recorder with the adjustable front lens according to claim 11, wherein the connecting member comprises a buckle plate, the buckle plate is clamped on a back portion of the recorder main body, a circular groove is defined in a side of the buckle plate away from the recorder main body, a rolling ball is inserted into an inner side of the circular groove, and the rolling ball is fixed to a toothed plate.

13. The recorder with the adjustable front lens according to claim 12, wherein the chassis is fixed to the connecting column by the fixing bolts, the control bolt passes through the connecting column to be in threaded connection with the rolling ball, and the control bolt is tightened to fix the connecting column.

14. The recorder with the adjustable front lens according to claim 1, wherein the back surface of the recorder main body is provided with anti-slip patterns.

15. A recorder with an adjustable front lens, comprising a recorder main body and a camera, wherein the camera is arranged on the recorder main body, the recorder main body is electrically connected to the camera, and the camera is capable of rotating relative to the recorder main body;

wherein the camera is capable of sliding in a direction away from the recorder main body;

wherein the camera is arranged on a back surface of the recorder main body, the camera is capable of sliding towards a top end of the recorder main body, and the camera is capable of sliding to a position higher than the top end of the recorder main body;

wherein when the camera slides to the position higher than the top end of the recorder main body, the camera is capable of rotating at least 180 degrees, so that an end surface of the camera equipped with a camera lens can rotate from a plane initially opposite to a front surface of the recorder main body to a position where the end surface of the camera equipped with the camera lens is on an identical plane with the front surface of the recorder main body;

wherein the recorder further comprises a sliding member, the sliding member is capable of rotating relative to the recorder main body, the camera is arranged at one end of the sliding member, and when the sliding member rotates relative to the recorder main body, the camera is driven to slide relative to the recorder main body;

wherein sliding teeth are provided on both sides of the sliding member, a clamping block is provided on the recorder main body, the clamping block is capable of clamping the sliding teeth, and the sliding teeth are capable of sliding relative to the clamping block.

* * * * *